(12) United States Patent
Bluschke et al.

(10) Patent No.: US 12,476,707 B2
(45) Date of Patent: Nov. 18, 2025

(54) ADAPTIVE ALIGNMENT OF OPTICAL WIRELESS COMMUNICATION DEVICES

(71) Applicant: SIGNIFY HOLDING B.V., Eindhoven (NL)

(72) Inventors: Andreas Felix Alfred Bluschke, Eindhoven (NL); Onno Martin Janssen, Geldrop (NL); Pamungkas Prawisuda Sumasta, Breda (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 181 days.

(21) Appl. No.: 18/280,695

(22) PCT Filed: Mar. 4, 2022

(86) PCT No.: PCT/EP2022/055503
§ 371 (c)(1),
(2) Date: Sep. 7, 2023

(87) PCT Pub. No.: WO2022/189271
PCT Pub. Date: Sep. 15, 2022

(65) Prior Publication Data
US 2024/0154696 A1 May 9, 2024

(30) Foreign Application Priority Data
Mar. 11, 2021 (EP) .................................... 21161945

(51) Int. Cl.
*H04B 10/00* (2013.01)
*H04B 10/114* (2013.01)
*H04J 14/00* (2006.01)

(52) U.S. Cl.
CPC ..... *H04B 10/1143* (2013.01); *H04B 10/1149* (2013.01)

(58) Field of Classification Search
CPC ... H04B 10/11; H04B 10/112; H04B 10/1121; H04B 10/1123; H04B 10/1125; H04B 10/1127; H04B 10/1129; H04B 10/114; H04B 10/1141; H04B 10/1143; H04B 10/1149; H04B 10/116; H04B 10/118
See application file for complete search history.

(56) References Cited

U.S. PATENT DOCUMENTS

| 7,236,705 B2 | 6/2007 | Moursund et al. |
| 2006/0018663 A1 | 1/2006 | Moursund et al. |
| 2006/0165416 A1 | 7/2006 | Moursund et al. |

(Continued)

FOREIGN PATENT DOCUMENTS

| CN | 112468228 A | 3/2021 |
| DE | 102016111980 A1 | 1/2018 |

(Continued)

*Primary Examiner* — Daniel G Dobson

(57) ABSTRACT

This invention relates to optical wireless communication systems that use radiation beams for communication. In such systems aiming at the communication partner is not easy especially if the distance between the communication devices is longer and radiation in the non-visible range is used. It is proposed to use an adaptive signal quality indicator in order to provide installing persons and users with a quick and deterministic way of aligning the communication devices.

14 Claims, 3 Drawing Sheets

(56) References Cited

U.S. PATENT DOCUMENTS

2022/0360329 A1\* 11/2022 Van Wageningen ........................ H04B 10/116
2023/0199158 A1\* 6/2023 Tsutsui ................. H04N 21/431
353/69

FOREIGN PATENT DOCUMENTS

| JP | H06232818 A | 8/1994 |
|----|-------------|--------|
| WO | 2017011649 A1 | 1/2017 |

\* cited by examiner

ADAPTIVE ALIGNMENT OF OPTICAL WIRELESS COMMUNICATION DEVICES

CROSS-REFERENCE TO PRIOR APPLICATIONS

This application is the U.S. National Phase application under 35 U.S.C. § 371 of International Application No. PCT/EP2022/055503, filed on Mar. 4, 2022, which claims the benefit of European Patent application Ser. No. 21/161,945.7, filed on Mar. 11, 2021. These applications are hereby incorporated by reference herein.

FIELD OF THE INVENTION

The invention relates to the field of setup or installation of optical communication networks, such as—but not limited to—LiFi networks, for use in various applications for home, office, retail, hospitality and industry.

BACKGROUND OF THE INVENTION

Optical wireless communication (OWC) systems, such as LiFi networks (named like WiFi networks), enable mobile user devices (called end points (EP) in the following) like laptops, tablets, smartphones or the like to connect wirelessly to the internet. WiFi achieves this using radio frequencies, but LiFi achieves this using the light spectrum (including the infrared (IR) and ultraviolet (UV) spectrum) which can enable unprecedented data transfer speed and bandwidth.

Furthermore, it can be used in areas susceptible to electromagnetic interference. An important point to consider is that wireless data is required for more than just our traditional connected devices. Today, televisions, speakers, headphones, printer's, virtual reality (VR) goggles and even refrigerators use wireless data to connect and perform essential communications. Radio frequency (RF) technology like WiFi is running out of spectrum to support this digital revolution and LiFi can help power the next generation of immersive connectivity.

Based on modulations, information in the coded light can be detected using any suitable light sensor. This can be a dedicated photocell (point detector), an array of photocells possibly with a lens, reflector, diffuser of phosphor converter, or a camera comprising an array of photocells (pixels) and a lens for forming an image on the array. E.g., the light sensor may be a dedicated photocell included in a dongle which plugs into the end point, or the sensor may be a general purpose (visible or infrared light) camera of the end point or an infrared detector initially designed for instance for 3D face recognition. Either way this may enable an application running on the end point to receive data via the light.

LiFi devices may be integrated in luminaires of illumination systems to provide high-speed wireless connectivity over large spaces, such as meeting rooms and office floors. There is seamless handover between each LiFi-enabled luminaire enabling users to roam around. As an example, a USB-access key plugged into a laptop can be used to receive a LiFi signal and act as an emitter to send data back to the luminaire.

Chinese patent application CN112468228A discloses a LiFi communication optimization method involving a terminal comprising a LiFi communication module, a LiFi steering control module and an ultra-wideband UWB communication module, wherein the LiFi steering control module is used for controlling the direction of the LiFi communication module. When a communication quality of the LiFi communication module drops below a preset communication quality, an exchange of UWB angle measurement data packets is triggered to determine a target angle required for adjustment through at least two UWB angle measurement data packets transmitted between the UWB communication module and a LiFi communication partner. The LiFi steering control module then performs a direction adjustment according to the target angle.

Furthermore, fixed point-to-point systems may be provided, which act like a wireless cable, ideal for connecting devices. Potential applications include connecting robots or machines in radio frequency (RF) harsh environments like industrial plants, or hospitals where RF communications may not be permitted, or where there is a need to send and receive large data files securely and quickly.

However, installation of such systems may cause problems if the distance between communicating LiFi devices is long (e.g. more than several meters), especially if invisible infrared (IR) beams are used for communication.

SUMMARY OF THE INVENTION

It is an object of the present invention to provide adaptive alignment support for communication devices of OWC systems.

According to a first aspect, an apparatus is provided for supporting alignment of a first OWC device to a second OWC device to provide an optical communication link between the first and second OWC devices, the apparatus comprising:
  a distance determination means configured to determine a distance between the first and second OWC devices;
  an alignment controller configured to determine based on the determined distance a maximum signal quality (e.g. signal strength, data rate, error rate etc.) receivable from the second OWC device and to determine a relative signal quality (e.g. signal strength, data rate, error rate etc.) based on the receivable maximum signal quality and a signal quality (e.g. signal strength, data rate, error rate etc.) received from the second OWC device and measured at the first OWC device; and
  an alignment indicator for providing an indication of an information related to the determined relative signal quality on a user interface, the indication relating the received signal quality relative to the maximum achievable signal quality at the determined distance.

According to a second aspect, a method of supporting alignment of a first OWC device to a second OWC device to provide an optical communication link between the first and second OWC devices is provided, the method comprising:
  determining a distance between the first and second OWC device;
  determining based on the determined distance a maximum signal quality receivable from the second OWC device;
  determining a relative signal quality based on the determined receivable maximum signal quality and a signal quality received from the second OWC device and measured at the first OWC device; and
  providing an indication of an information related to the determined relative signal quality on a user interface, the indication relating the received signal quality relative to the maximum achievable signal quality at the determined distance.

Accordingly, based on the proposed alignment indicator, the installing person can be provided with predetermined criteria for proof/confidence of alignment, e.g., "above X Mbps", or "within Y % from max achievable rate".

Such indication may on a low-cost apparatus be provided by means of visual indicator for the operator/user, in the form of a simple linear LED bar indicator, consisting of a number of indicator LEDs, providing an indication of the relative signal quality, where the full bar represents the maximum achievable signal quality. Alternatively, such indication may be provided by means of more feature rich graphical user interface, which may include matrix displays, or graphical displays that may provide a numeric, textual and/or graphical output to the user. A variety of such output formats are envisaged on such screens, ranging from a dial indicator, a bar indicator, or other graph depicting the relative signal quality versus the achievable quality.

Moreover, the installing person no longer requires any special tools and needs to climb the ladder only once for initial mounting and rough alignment and optionally a second time if fine alignment needs to be carried out at the respective OWC device. As a result, the installing person can install two OWC devices with minimum steps/actions and prove that the installation delivers the best OWC connection performance for the environment and distance between the OWC devices.

According to a third aspect, a remote control device is provided, which provides remote control of an alignment of a first OWC device to a second OWC device to provide an optical communication link between the first and second OWC devices, the remote control device comprising an apparatus according to the first aspect, wherein the alignment controller is configured to control an orientation of the first OWC device in space by wirelessly transmitting a control signal to a controllable mounting arrangement provided at the first OWC device in response to a user input operation at the remote control device. Thereby, the installing person does not need to climb a ladder to fine tune the OWC device but can simply stay at the ground and use the remote control device to adjust the orientation of the OWC device until a proper alignment indicator value is shown on the remote control device.

According to a fourth aspect, an add-on module mountable to an OWC device is provided, the add-on module comprising an apparatus according to the first aspect.

According to a fifth aspect, an OWC device comprising an apparatus according to the first aspect is provided.

According to a sixth aspect, a computer program product is provided, which comprises code means for producing the steps of the above method of the second aspect when run on a controller device.

According to a first option which may be combined with any of the first to sixth aspects, the distance may be determined based on a time-of-flight measurement between a pulse signal transmitted to the second OWC device and a return pulse signal received from the second OWC device. Thereby, a simple signal exchange between the two OWC devices via the optical communication channel or an additional out-of-band channel can be used to determine the distance required for deriving the maximum signal quality receivable from the second OWC device.

According to a second option which may be combined with the first option or any of the first to sixth aspects, the receivable maximum signal quality may be derived from a stored predetermined performance characteristic that associates the receivable maximum signal quality to the measured distance. Thus, the receivable maximum signal quality as a reference value for the alignment state can be derived from the stored performance characteristic by a simple look-up operation.

According to a third option which may be combined with the first or second option or any of the first to sixth aspects, an orientation of the first OWC device in space may be controlled by applying a control signal derived from user input to a controllable mounting arrangement of the first OWC device or, alternatively, a direction of a light output of the OWC device may be controlled by applying a control signal derived from user input to a controllable beam steering arrangement of the first OWC device. This measure provides the advantage that the orientation (e.g. attitude) of the first OWC device or only the direction of the light output can be adjusted based on the alignment indication to facilitate fine adjustment of the alignment. The attitude of an OWC device characterizes the orientation of the OWC device with respect to a set of reference axes. Attitude is commonly specified relative to the earth horizon, using pitch, yaw and roll angles. However, when the emission pattern of the OWC device is symmetrical around the longitudinal or roll axis, the OWC device orientation may also be characterized using pitch and yaw only as roll, in this case, does not affect the emission pattern.

According to a fourth option which may be combined with any of the first to third options or any of the first to sixth aspects, an attitude determination system may be provided for determining an attitude of the first OWC device. This provides the advantage that the attitude (e.g. measured roll, pitch and yaw angles) of the first OWC device and its relation to the attitude (e.g. measured roll, pitch and yaw angles) of the second OWC device can be considered in the alignment indicator value.

According to a fifth option which may be combined with any of the first to fourth options or any of the first to sixth aspects, a value of the alignment indicator may be calculated by using the following equation:

$$((RX1+RX2)/(2*ORX)*(1-TAE))*100\%,$$

wherein RX1 designates the measured signal quality at the first LiFi device, RX2 designates the measured signal quality received from the second OWC device, ORX designates the maximum signal quality receivable from the second OWC device at the measured distance, and TAE designates a total attitude error between attitude angles of the first OWC device and respective attitude angles received from the second OWC device.

The parameter TAE may itself aggregate a total orientation error from multiple axes (yaw, pitch, and roll) and may be calculated using the following equation:

$$TAE = \frac{\text{Yaw Error} + \text{Pitch Error} + \text{Roll Error}}{3}$$

Furthermore, these errors may be derived using the following formula:

$$\text{Yaw Error} = \frac{\text{ABS}(L1zt - L2z)}{360}$$

$$\text{Pitch Error} = \frac{\text{ABS}(L1yt - L2y)}{180}$$

$$\text{Roll Error} = \frac{\text{ABS}(L1xt - L2x)}{360}$$

wherein L1zt, L1yt, L1xt, designate calculated counter attitude angles of each axis of the first OWC device and L2z, L2y, L2x designate measured orientation angles received from the second OWC device.

Thereby, the fine adjustment of the alignment between the first and second OWC devices can be achieved by exchanging signal quality and attitude parameters and calculating the alignment indicator based on the exchanged parameters to achieve a straightforward iterative alignment process.

According to a sixth option which may be combined with any of the first to fifth options or any of the first to sixth aspects, the alignment indicator may be switched from the indication of the information related to the relative signal quality to an indication of an information related to an absolute value of the measured received signal quality at the first OWC device. Thereby, a coarse alignment can be done prior to determination of the distance.

According to a seventh option which may be combined with any of the first to sixth options or any of the first to sixth aspects, the OWC device of the fifth aspect may further comprise an out-of-band transceiver used for at least one of alignment communication and distance measurement. Thereby, the OWC transceiver can be relieved from alignment communication and distance measurement load and/or interference.

According to an eighth option which may be combined with any of the first to seventh options or any of the first to seventh aspects, the OWC device of the fifth aspect may further comprise a controllable mounting arrangement configured to change an orientation of the OWC device while mounted. This allows a control of the orientation (e.g. attitude) of the OWC device based on the alignment indicator value to allow automatic or remote fine adjustment after mounting of the first and second OWC devices.

According to a ninth option which may be combined with any of the first to eighth options or any of the first to sixth aspects, the OWC device of the fifth aspect may further comprise a mechanic or electronic control element configured to control the alignment controller to provide a higher or lower resolution of the alignment indicator. Thereby, the resolution of the adjustment indicator can be changed during the fine alignment process to allow a more precise approach to the best performance value.

It is noted that the above apparatuses may be implemented based on discrete hardware circuitries with discrete hardware components, integrated chips, or arrangements of chip modules, or based on signal processing devices or chips controlled by software routines or programs stored in memories, written on a computer readable media, or downloaded from a network, such as the Internet.

It shall be understood that a preferred embodiment of the invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Various embodiments of the present invention are now described. Based on an optical wireless communication (OWC) system with OWC communication devices (OWC devices).

Throughout the following, LiFi and OWC are used interchangeably and light source or optical transmitter may be understood as a radiation source that generates visible or non-visible light (i.e., including infrared (IR) or ultraviolet (UV)) for communication or other purposes (e.g. safety/security light barriers). Light source suitable for OWC applications may vary from application to application and might be selected based on application needs, such as bandwidth, cost or power budget. Often used light sources in OWC systems are for example Light Emitting Diodes (LEDs), a Vertical Cavity Surface Emitting Lasers (VCSELs), or other types of laser sources; optionally fitted with suitable optics so as to achieve a desired emission field-of-view. The light source may be included in a luminaire, such as a recessed or surface-mounted incandescent, fluorescent or other electric-discharge luminaires.

The underlying idea of LiFi communication is to provide a line of sight between LiFi devices. As a result, the LiFi infrastructure needs to be well positioned or aligned to provide optical wireless communication that requires line of sight.

Figure 1:
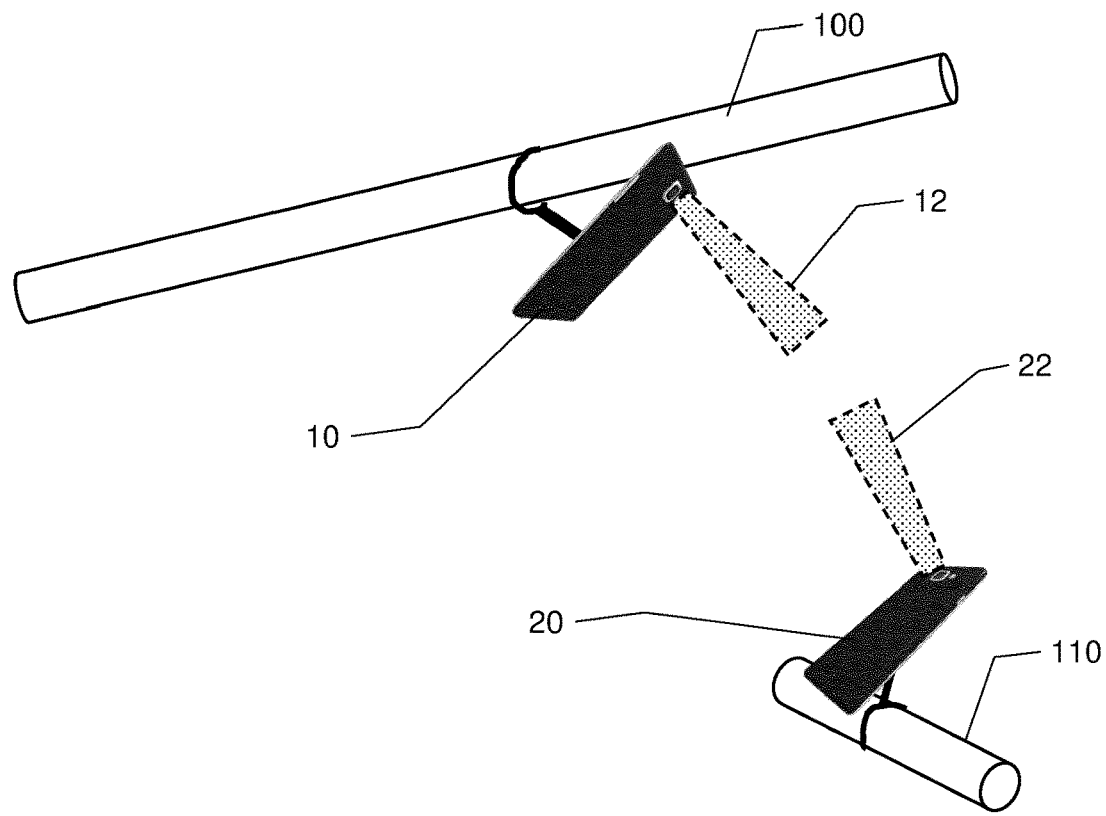
FIG. 1 shows schematically a communication link of an optical communication system prior to alignment.

FIG. 1 shows schematically a communication link between two LiFi devices 10, 20 prior to alignment.

It is noted that—throughout the present disclosure—only those structural elements and functions are shown, which are useful to understand the embodiments. Other structural elements and functions are omitted for brevity reasons.

The optical communication link of FIG. 1 is to be installed or setup between a first LiFi device 10 movably mounted at a first shelf 100 or another mounting facility and a second LiFi device 20 movably mounted at a second shelf 110 or another mounting facility. The first LiFi device 10 comprises a first light source that emits a first light output 12 (e.g. light beam) which shall be received by the second LiFi device 20. Similarly, the second LiFi device 20 comprises a second light source that emits a second light output 22 (e.g. light beam) which shall be received by the first LiFi device 10.

The following problems are known from practical installations of LiFi systems at longer distances (e.g. about 10 m and more):

The installing person has two LiFi devices, each with a laser pointer, and mounting brackets. The installing person may need to establish a horizontal connection at a height of about 3 m above the floor. The installing person goes to a first mounting point, goes up the ladder, mounts the first LiFi device 10, uses the laser pointer to roughly aim at the place where he plans to mount the second LiFi device 20. He/she then connects the first LiFi device 10 to a power source (e.g. a power-over Ethernet (PoE) network), but as he/she has only the single LiFi device 10 available, there is no signal yet.

Then, the installing person goes to the other mounting location, climbs up the ladder, mounts the second LiFi device 20. He/she uses the laser pointer to aim at the lenses of an optical system of a light detector of the mounted first LiFi device 10. This is quite difficult at a distance of e.g. 10 m, as small movements are translated to big movements of the laser dot at the first LiFi device 10. Therefore, the installing person needs a mechanical mounting aid that allows for very small adjustments of the laser pointed. Moreover, it is noted that the laser pointer dot on the lens presents a false sense of alignment, as there is a parallax error and tolerances of the laser pointer itself which cause the best alignment not being the same as the dot on the lens. Therefore, the laser pointer alignment is a "rough alignment".

Once the second LiFi device 20 second is correctly aimed at the first LiFi device 10 with the laser pointer, the installing person connects the second LiFi device 20 to the power source (e.g. PoE network). Then he/she has to check on the second LiFi device 20 whether an indicator (e.g. yellow LED) starts blinking as proof of the two LiFi devices 10, 20 "seeing" each other and thus having a LiFi communication link. Next, the installing person opens a web browser and sees a connection, with certain receiver (RX) and transmitter (TX) values.

This means that the installing person needs to climb down the ladder, fetch a laptop with network access to both LiFi devices 10, 20. However, often installing persons do not have a laptop available and the LiFi devices 10, 20 initially have the same IP address, so that the installing person needs to know how to setup the laptop and network to access the correct LiFi device to see the RX and TX values.

Now, the installing person climbs up the ladder again and fine tunes the alignment to the maximum level (e.g. data rate) of the RX signal on the LiFi device he is adjusting. Then, the installing person goes back to the other LiFi device, repeats the fine tune action, now on the laptop looking at the RX and TX values of this device, and adjusts to the maximum level (e.g. data rate) of the RX signal.

However, the installing person does not know whether the achieved maximum level (e.g. data rate) is the best possible for the installed distance within a certain margin of error of the capabilities of the LiFi link.

Moreover, the alignment is not possible without a laptop or access to a web site on the LiFi devices 10, 20.

According to various embodiments, the above problems can be solved by an adaptive alignment process that is based on an alignment indicator provided on the LiFi devices 10, 20 themselves or a remote alignment control device. The proposed alignment indicator is usable, robust and simple/cheap but still has sufficient resolution.

The proposed alignment process allows use of the light source and/or photo detector of the LiFi devices and ensures that the real distance between the LiFi devices is measured.

Figure 2:
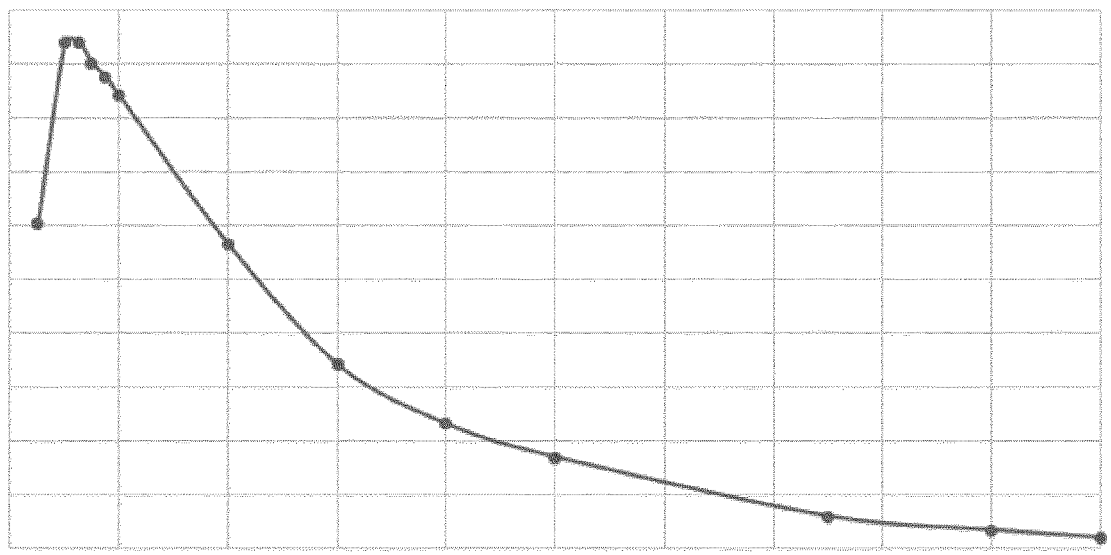
FIG. 2 shows a diagram with a performance curve of speed versus distance between optical communication devices.

FIG. 2 shows a diagram with a performance curve of transmission quality or speed (e.g. data rate or throughput (Mbit/s)) versus distance (m) between optical communication devices, wherein the vertical axis indicates the transmission quality or speed over the communication link and the horizontal axis indicates the distance.

The performance curve can be used to determine the best link performance (i.e. signal quality) in terms of signal strength, data rate (throughput), error rate etc. achievable for an installation with a particular distance. Thus, knowing the distance between both LiFi devices 10, 20, the installing person can use the performance curve (provided e.g. in a specification sheet or electronically stored on the LiFi devices 10, 20 or another installation device) to check if the signal quality measured after installation of the LiFi devices indicates a correct alignment. Hence, if the installing person has a measurement tool available to measure the distance between the LiFi devices with, he/she is able to compare the measured signal quality values with the performance curve. And if the measured signal quality does not match with the best signal quality indicated in the performance curve, the installing person may repeat the fine tuning at both LiFi devices until the signal qualities measured at both LiFi devices are close enough to the performance curve to complete the installation process.

The proposed alignment indicator can be configured as a signal indicator with sufficient resolution, that indicates optimal alignment and maximum achievable data rate according to the distance.

The performance curve/characteristic provides an abstraction of at least the transmit characteristics of a LiFi device (or a specific type of LiFi device) and may, for example, be stored in the form of a look-up table, allowing use as is, or using linear approximation, a spline model, or other type of representation. When installing two devices of the same type, as may happen quite frequently in proprietary, non-standardized products, preferably the performance characteristics are stored in the device. In this manner installation is simplified and the performance characteristic covers implicitly (on account of the devices being the same) the transmit characteristics of the other device, as well as the receive characteristics of the device itself.

Alternatively, when two different types of devices are being installed, the installer may select the appropriate performance characteristic(s) to be used prior to installation, or alternatively the devices may exchange device types and each select the appropriate performance characteristic from on on-board storage, or more alternatively, the devices may exchange their performance characteristics with one another, e.g. using a low-bandwidth RF interface. The performance characteristic may characterize the transmitting device's output characteristics, which may be used to establish a relative signal quality. Optionally, in such an implementation the receiving device may compensate for known losses resulting from its own reception path, resulting in a more accurate relative signal quality.

In yet more advanced systems, preferably the performance characteristic is established for the specific types of LiFi devices involved, also taking into account the communication direction between devices. These pair-wise performance characteristics may be established by using devices of the specific types of LiFi devices and for both communication directions in a calibration process. In this manner an even better relative signal quality level may be obtained taking into account both the transmission and reception optics in the respective direction. The level of accuracy of the performance characteristic required may be determined based on the specific application constraints.

Regardless of whether installing identical or different types of devices, preferably the performance characteristic information is shared prior to the installation process.

In operation the apparatus located at a first LiFi device, may determine a maximum signal quality receivable from the second LiFi device based on the performance characteristic of the second LiFi device. In most applications the transmit power level will be set to the maximum possible, so as to maximize the SNR at the receiver and thereby operating speed. However, in the event the second LiFi device is capable of operating at different optical transmit power levels, then during the installation phase this may be overruled and may be set to the transmit power level used for modeling or measuring the performance characteristic.

Figure 3:
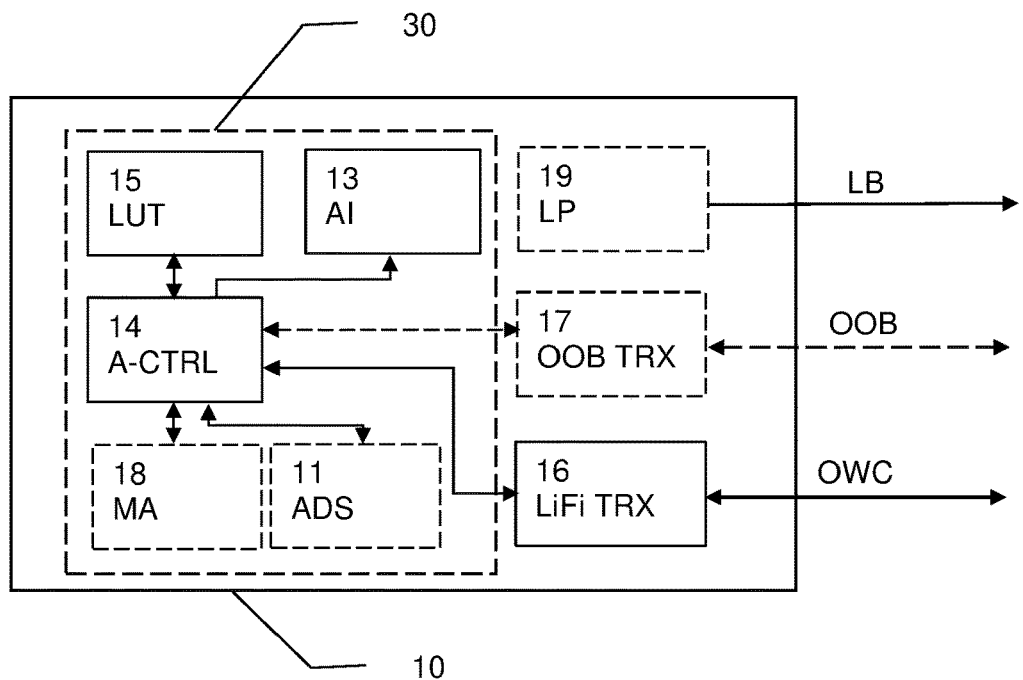
FIG. 3 shows schematically a block diagram of an optical communication device with adaptive alignment according to various embodiments.

FIG. 3 shows a block diagram of an optical communication device, e.g. LiFi device 10, with adaptive alignment support according to various embodiments.

The LiFi device 10 comprises a LiFi transceiver (LiFi TRX) 16 that includes a light source (e.g. LED or laser diode) as a light emitter and a light detector (e.g. photo diode or optical sensor) for transmitting and receiving an OWC (LiFi) signal. Optionally, the LiFi device 10 may further include an out-of-band (OOB) transceiver (OOB TRX) 17 that allows transmission and reception of an out-of-band signal (e.g., an optical signal of a wavelength range outside the LiFi wavelength range or an RF signal (e.g. near-field communication (NFC), Bluetooth, WiFi, ZigBee, UWB etc.) and can be used for alignment communication or distance measuring purposes.

Furthermore, the LiFi device 10 may be powered via a power line or a connection to a PoE system (not shown).

The signals transmitted/received to/from the transceiver(s) 16 and 17 are controlled and processed by an alignment controller (A-CTRL) 14 that is configured to determine an adaptive value of an alignment indicator 13 based on an alignment procedure (as described e.g. with reference to FIG. 4 or 5A-C) and is connected to a memory 15 with a look-up table (LUT) and an optional controllable mounting arrangement (MA) 18 configured to change an attitude of the LiFi device 10 while mounted, e.g., via rough and fine-adjustment (motorized control may be optional). The LUT may include distance values and their associated best signal quality values (e.g. throughput (data rate) as obtained from the performance curve of FIG. 2.

An alternative way of automatic adjustment of the alignment could be to change the direction/orientation of the light output (light beam) of the LiFi transceiver 16 by a mechanical or electronical beam steering function or mechanism (not shown) provided at the LiFi transceiver 16. In an example, this could be achieved by providing a multi-array transmitter with electrical beam steering or a by providing mechanically controllable beam optics.

According to various embodiments, the alignment controller 14 may be configured to determine or calculate an indicator value of the adaptive alignment indicator 13 on the LiFi device 10 based on the distance between the LiFi devices to be aligned to obtain the associated maximum achievable performance (signal quality) using e.g. the performance curve of FIG. 2.

In an example, the alignment indicator 13 may comprise a simple multi-LED array or other kind of display with a kind of logarithmic scale, which can be used for fine tuning. On/off states of the LEDs or other display indicators can be used to indicate a specific performance level. As the alignment indicator is adaptive, this performance level is in percentage of the maximum value achievable.

Additionally, a distance measurement is performed by the alignment controller 14, which is directly linked to the maximum achievable performance and thus to the scale of the indicator elements. The distance measurement can be achieved by using the LiFi transceiver 16 or the out-of-band transceiver 17.

In an example, the distance measurement can be based on a time of flight (ToF) concept, where a pulse signal is transmitted to the other end (i.e. second LiFi device) and the other end responds with a return pulse signal. At the originating end the time difference between sending the pulse signal and receiving the return pulse signal is measured, while the time required for the device at the other end to receive and respond and the delay time of the involved electronics are subtracted, leaving the time for the pulse to travel between the devices at both ends. The distance then corresponds to half of the obtained time. Each of the devices at both ends can initiate and perform such a distance measurement, so that both devices have the distance available.

It is noted that for ToF measurements using light signals, the clock resolution must be high enough to measure the distance with an accuracy at least in the centimeter or decimeter range.

Of course, other distance measurement options could be used, e.g., based on measuring the intensity or another parameter of the returned signal, or the principle of triangulation where the distance is calculated according to an angle of a reflected IR beam off a surface.

Optionally, an attitude determination system (ADS) 11 may be built-in or attached to the LiFi device 10 for determining a parameter indicating at least an attitude of the LiFi device 10. It may include an attitude and heading reference system (AHRS) that consists of sensors on three axes that provide a raw attitude information for the LiFi device 10, including roll, pitch and yaw angles. The sensors my comprise MARG (Magnetic, Angular Rate, and Gravity) sensors that consist of either solid-state or microelectromechanical systems (MEMS) comprising gyroscopes, accelerometers and/or magnetometers. The attitude determination system 11 may include an integrated processing system that is specifically designed to track attitude and heading information. As an alternative, the processing function of the integrated processing system may be provided by the alignment processor 14. AHRS has a superior build quality that cuts out the middleman that IMU relies on.

As an alternative, the attitude determination system 11 may include an inertial measurement unit (IMU) which delivers sensor data to the alignment processor 14 that computes at least the attitude information. The AHRS differs from the IMU in that it may directly provide attitude and heading information and may apply sensor fusion to compensate for drift from a gyroscope integration by reference vectors, namely gravity, and the earth magnetic field. This results in a drift-free orientation, making the AHRS a more cost-effective solution than conventional high-grade IMUs that only integrate gyroscopes and rely on a very high bias stability of the gyroscopes.

Thus, the attitude determination system 11 provides the attitude of the LiFi device 10, which may correspond to the vertical orientation of the LiFi device and may be expressed as Quaternions or Euler angles. The rotation around the axes may correspond to the order of axes z-y-x and may be defined as a yaw angle (e.g. L1z, L2z), a pitch angle (e.g. L1y, L2y) and a roll angle (e.g. L1x, L2x), respectively, as e.g. per Tait-Bryan convention. The yaw and roll angles are in the range of $-\pi$ to $+\pi$ ($-180°$ to $+180°$) whereas the pitch angle is defined between $-\pi/2$ and $+\pi/2$ ($-90°$ to $+90°$).

The alignment controller 14 may be configured to control the attitude of the mounted LiFi device 10 in space by applying respective control signals to the mounting arrangement 18 in order to initiate movements that control at least one of the pitch, roll or heading angle.

Additionally, the LiFi device 10 may include an optional optical pointer (e.g. laser pointer (LP)) 19 adjustably or fixedly directed in the direction of the transmission beam of the LiFi transceiver 16 to enable an installing person to aim at the mounting position of a second LiFi device at the other end of a desirable communication link to be installed.

Thus, the alignment controller 14 has access or may determine the received signal quality at the LiFi device 10, the signal quality received at the distant LiFi device at the other end of the communication link (e.g. signaled via the OOB transceiver 17 or the LiFi transceiver 16), the distance between the LiFi devices at both ends of the communication link, an optional OOB channel for the LiFi devices to exchange alignment information, the optional attitude of the LiFi device 10 obtained from the built-in or attached attitude determination system 11 and sharable over the OOB or LiFi channel, an optional attitude obtained from a built-in or attached attitude determination system of the other LiFi device and shared over the OOB or LiFi channel.

A switch or other mechanic or electronic control element (not shown) may be provided to set (e.g. via the alignment controller 14) a higher or lower resolution of the alignment indicator, while distinct indicator elements (e.g. LEDs) may remain allocated to distinct performance levels. E.g., a position of the resolution control element may control the resolution of the alignment indicator so that an on-state of the last indicator element corresponds to a performance level (signal quality level) better than 95%, while an off-state means worse than 90%. Furthermore, a position y of the resolution control element may control the resolution of the alignment indicator so that the last indicator element corresponds to a performance level (signal quality) better than 98%, while an off-state means worse than 95%.

As a further option, a further switch may be provided to set the alignment indicator 13 (e.g. via the alignment controller 14) to show an absolute signal quality (e.g. signal strength or data rate).

As a still further option, another switch may be provided to (de-)activate an installation mode with the alignment option on the LiFi device 11.

The alignment indicator may be determined based on a signal quality obtained from a received LiFi signal and/or from a distance measurement pulse signal received via the OOB channel.

In an example of the embodiment, the alignment indicator value (as a percentage) can be calculated by using the following equation:

$$((RX1+RX2)/(2*ORX)*(1-TAE))*100\%,$$

wherein RX1 designates the measured signal quality at the first LiFi device, RX2 designates the measured signal quality at the second LiFi device, ORX designates the maximum signal quality for the measured distance (obtained e.g. via the LUT according to e.g. the performance curve of FIG. 2), and TAE designates a total attitude error between calculated counter angles of the first OWC device 10 and measured attitude angles received from the second OWC device 20.

The parameter TAE may be defined to aggregate a total orientation error from multiple axis (yaw, pitch, and roll) and may be calculated using the following equation:

$$TAE = \frac{\text{Yaw Error} + \text{Pitch Error} + \text{Roll Error}}{3}$$

Furthermore, the above errors may be derived using the following formulas:

$$\text{Yaw Error} = \frac{\text{ABS}(L1zt - L2z)}{360}$$

-continued $$\text{Pitch Error} = \frac{\text{ABS}(L1yt - L2y)}{180}$$

$$\text{Roll Error} = \frac{\text{ABS}(L1xt - L2x)}{360}$$

wherein L1zt, L1yt, L1xt designate the calculated counter angles of each axis of the first OWC device 10 and L2z, L2y, L2x designate the measured orientation angles of the second OWC device 20.

In a perfect alignment, the calculated counter angles on every axis should match the received attitude orientation reading from the second OWC device 20 thus resulting in a TAE equals to zero.

Thus, the proposed alignment indicator is obtained by dividing the average value of the signal qualities measured at both LiFi devices by the maximum signal quality for the measured distance and multiplying the result by the difference between 1 and the absolute value of the difference between the attributes of the first and second LiFi devices.

In an embodiment, the above alignment controller 14 with the memory (LUT) 15, the alignment indicator 13, the optional controllable mounting arrangement 18 and the optional attitude and heading system 11 (and possibly also the optional laser pointer 19 and OOB transceiver 17) may be provided as a separate alignment control module (add-on) 30 that can be added to or integrated in conventional LiFi devices to allow an upgrade to the proposed adaptive alignment functionality. The separate alignment control module (add-on) 30 may be provided in a separate housing that can be mounted on the LiFi device 10 or as a chip module or chip set that can be integrated on a circuit board of the LiFi device 10.

In another embodiment, the above alignment controller 14 with the memory (LUT) 15 and the alignment indicator 13 may be provided in a separate remote alignment control device that can be wirelessly (e.g. IR, NFC, Bluetooth, WiFi, ZigBee etc.) connected to the LiFi device 10 to receive the measured signal qualities and optional attitudes of the first and second LiFi devices 10, 20 and allow a remote control of the mounting orientation (i.e. attitude) of the controllable mounting arrangement 18 or of the beam direction of the LiFi transceiver 16 by an installing person via a user input operation to the alignment controller 14 with the help of the alignment indicator 13.

Figure 4:
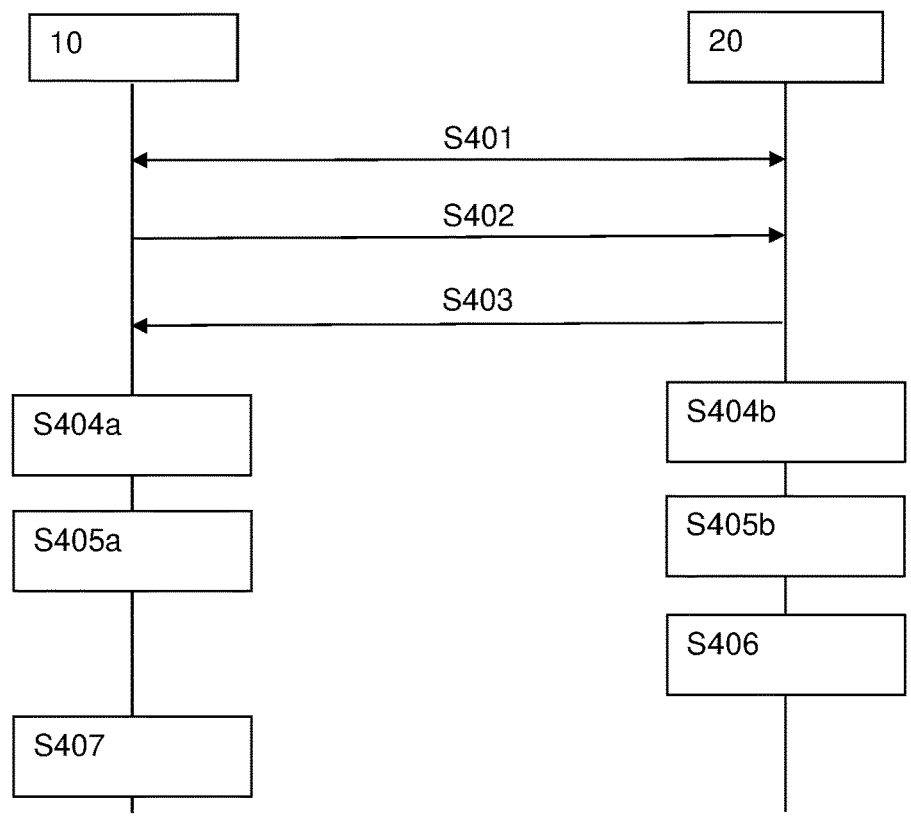
FIG. 4 shows schematically a processing and signaling diagram of an adaptive alignment procedure according to various embodiments.

FIG. 4 shows schematically processing and signaling diagram of an adaptive alignment procedure between a first LiFi device 10 and a second LiFi device 20 according to various embodiments.

In the signaling and processing sequence of FIG. 4, the vertical direction from the top to the bottom corresponds to the time axis, so that messages or processing times/steps shown above other messages or processing times/steps occur at an earlier time.

In the following procedure, it is assumed that an alignment indicator is determined on each of the first and second LiFi devices 10, 20, wherein the scale of the alignment indicator corresponding to relative performance levels (e.g. 0% to 100%). Furthermore, each of the LiFi devices 10, 20 includes a memory that stores a table reflecting the performance curve with achievable maximum signal quality versus distance, as shown in FIG. 2.

During the alignment procedure, an installing person may be present on a ladder with simple tools, no laptop, no special signal measurement tool or other smart equipment, to (fine)adjust the mounting by watching the alignment indicator on the LiFi device at his/her position and to prove or confirm that the installation is done with the best LiFi connection performance possible.

Initially, the installing person mounts the first LiFi device 10, aims it roughly towards the position where the second LiFi device 20 will be mounted later and powers on the first LiFi device 10 (power may, for instance, be obtained from plugging in a network cable with PoE). An optional laser pointer or other pointing device may be used for this rough alignment.

Now, the alignment indicator does not show a signal as the second LiFi device is not installed/active yet.

Next, the installing person mounts the second LiFi device 20 (e.g. with the help of the laser pointer) and aims it roughly towards the position where the first LiFi device 10 has been mounted and powered on.

Then, the second LiFi device 20 is powered on and the alignment procedure can start with step S401, where the LiFi devices 10, 20 are connected, e.g., via an OOB or LiFi channel.

In step S402, a parameter RX1 (that indicates a LiFi (G.vlc) signal quality or an OOB signal quality measured at the first LiFi device 10) is sent from the first LiFi device 10 to the second LiFi device 20 and received by the respective transceiver of the second LiFi device 20.

Similarly, in step S403, a parameter RX2 (that indicates a LiFi (G.vlc) signal quality or an OOB signal quality measured at the second LiFi device 20) is sent from the second LiFi device 20 to the first LiFi device 10 and received by the respective transceiver of the first LiFi device 10.

Optionally, an attitude parameter L1zt, L1yt, L1xt indicating the current counter angles of the first LiFi device 10 are passed to the second LiFi device 20 in step S402 or an additional signaling step, and an attitude parameter L2z, L2y and L2x indicating the current attitude angles of the second LiFi device 20 are passed to the first LiFi device 20 in step S403 or an additional signaling step.

Thereafter, in steps S404a and S404b, respective distance measurements are done between the first and second LiFi devices and the measured distance value is thus available on both LiFi devices 10, 20. Alternatively, the distance measurement could be done at one of the two LiFi devices 10, 20 only and the measured distance could be signaled to the respective other one of the LiFi devices 10, 20.

Then, in steps S405a and S405b, both LiFi devices 10, 20 determine the maximum signal quality (e.g. parameter ORX), e.g. based on the stored LUT and the measured distance, and the alignment indicator value, e.g., based on the above equation.

In the subsequent step S406, the installing person fine-adjusts the aiming of the second LiFi device 20 (e.g., at the second LiFi device 20 or via a remote alignment control device) to optimize the alignment indicator reading to a desired value.

Then, the installing person reverts to the first LiFi device 10 and fine-adjusts the aiming of the first LiFi device 10 in step S407 (e.g., at the first LiFi device 20 or via the remote alignment control device) to optimize the alignment indicator reading, which should now indicate the maximum indicator level.

Finally, the installing person may go back to the second LiFi device 20 to verify that the alignment indicator reading shows the maximum indicator level there as well.

The fact that both LiFi devices 10, 20 show alignment indicators at a certain common level proves that the LiFi communication link is set to a maximum performance level for the given configuration.

In an alternative embodiment, after steps S405a and S405b, a parameter representing the alignment indicator value may be exchanged between the two LiFi devices 10, 20 and their alignment controllers may iteratively control respective motorized mounting or beam steering arrangements to fine adjust the mounting orientation (e.g. attitude) or beam direction of the two LiFi devices 10, 20 until both alignment indicators have reached a maximum or sufficient indicator level. Thereby, a fully automized alignment process without fine-tuning interaction of the installing person after mounting can be achieved.

Figure 5A:
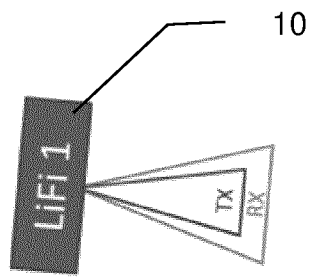
FIGS. 5A to 5C show successive steps of an exemplary alignment procedure according to various embodiments.
Figure 5B:
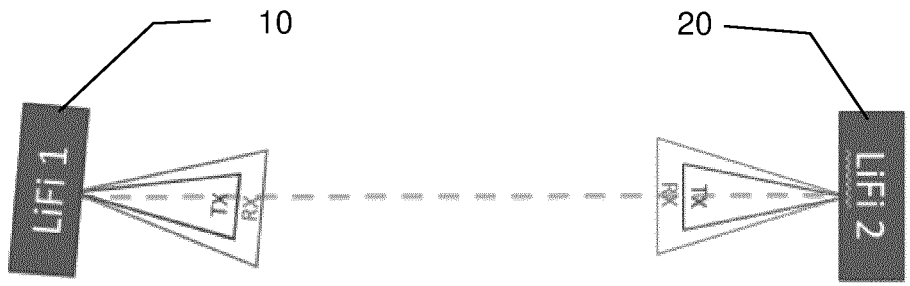
Figure 5C:
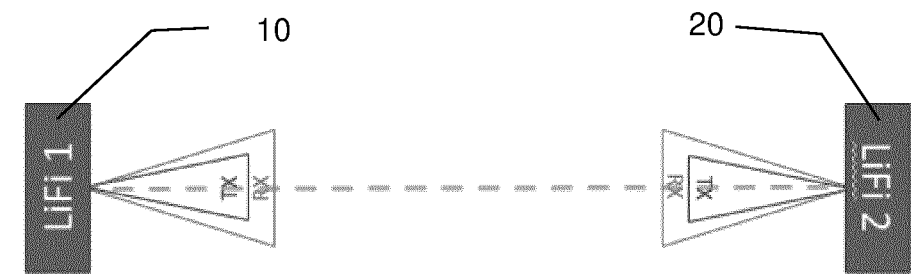

FIGS. 5A to 5C show successive steps of an exemplary 3-step alignment process according to various embodiments.

In the first step of FIG. 5A, pre-conditions are that none of the LiFi devices 10, 10 to be aligned is installed. The installing person knows the rough position of where the LiFi devices 10, 20 shall be mounted. The first device (LiFi1) 10 continuously sends a data probe via a transmission beam (TX) and waits for the receipt of an acknowledgement via a reception coil from the second LiFi device (LiFi2) 20 that is yet to be installed.

The first LiFi device 10 may be aimed with approximation that it is pointing at a possible mounting location of the second LiFi device 20. This condition is a pre-requirement for continuation of the 3-step alignment process.

In the second step of FIG. 5B, pre-conditions are that the first LiFi device 10 has been installed and points with approximation to the mounting location of the second LiFi device 20. Now, the second LiFi device 20 can be installed at the area (mounting location) where the first LiFi device 10 is roughly pointing at, as planned.

After mounting, the second LiFi device 20 sends an acknowledgement via its transmission beam (TX) towards the first LiFi device 10. Now, both LiFi devices 10, 20 can run a distance measurement algorithm between them. In an example, the first LiFi device 10 sends an information about the quality level (e.g. power level, error level, data rate etc.) received from the second LiFi device 20 to the second LiFi device 20. As a result, the second LiFi device 20 has now information available about the distance between the first and second LiFi devices 10, 20, the received quality level at the first and second LiFi devices 10, 20 and throughput rate on the physical channel.

The second LiFi device 20 may indicate a signal quality considering a relationship or characteristic of reference data versus calculated signal quality.

The process may be configured to prioritize the maximum alignment from the second LiFi device 20 to the first LiFi device 10, as it can be assumed that the first LiFi device 10 is not exactly directed at the second LiFi device 20 and therefore does not provide the highest received quality level. Knowing the distance, the scale of the on-board signal quality indicator may be configured as a relative scale, so that the installing person can always aim for a target value of 100%.

Once the target value of 100% is reached, the installing person can be certain that the second LiFi device 20 is precisely aligned and aimed at the first LiFi device 10.

In the third step of FIG. 5C, a pre-condition is that the second LiFi device 20 has been installed and points precisely at the first LiFi device 10. The alignment quality of the second LiFi device 20 can be verified by the installing person through the on-board signal quality indicator of the second LiFi device 20.

The internal system of the first LiFi device 10 is aware that signal quality alignment at the second LiFi device 20 is at 100%. This means that orientation/attitude of the second LiFi device 10 is "locked". Now, the first LiFi device 10 requests information about the attitude (e.g. pitch and roll angle) of the second LiFi device 20 and calculates a signal quality but this time taking the received orientation/attitude information into account during the calculation.

The signal quality indicator becomes 100% if the distance, quality and attitude information match correctly.

In this last step, the installing person can perform a fine alignment at the first LiFi device 10 towards the second LiFi device 20. Again, the installing person can aim for a target value of 100% signal quality, wherein the orientation information can be provided by an on-board indicator to inform the installing person about the direction to rotate.

An alignment signal indicator of 100% is obtained if both LiFi devices 10, 20 are perfectly aligned in the light of all parameters entered to the algorithm. E.g., it should not allow a signal quality of 100% if the quality vs. distance is correct but the attitude does not match. This might imply a defect of the optical unit at one of the LiFi devices 10, 20.

To summarize, an optical wireless communication system that use radiation beams for communication has been described. In such systems aiming at the communication partner is not easy especially if the distance between the communication devices is longer and radiation in the non-visible range is used. It is proposed to use an adaptive signal quality indicator in order to provide installing persons and users with a quick and deterministic way of aligning the communication devices.

While the invention has been illustrated and described in detail in the drawings and foregoing description, such illustration and description are to be considered illustrative or exemplary and not restrictive. The invention is not limited to the disclosed embodiments. The proposed adaptive alignment concept can be applied to all types of beamed OWC applications or other types of optical wireless networks. In particular, the invention is not limited to LiFi-related environments, such as the ITU-T G.9961, ITU-T G.9960, and ITU-T G.9991 network environment. It can be used in visible light communication (VLC) systems, IR data transmission systems, G.vlc systems, OFDM-based systems, connected lighting systems, OWC systems, and smart lighting systems.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. The foregoing description details certain embodiments of the invention. It will be appreciated, however, that no matter how detailed the foregoing appears in the text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

A single unit or device may fulfill the functions of several items recited in the claims. The mere fact that certain measures are recited in mutually different dependent claims does not indicate that a combination of these measures cannot be used to advantage.

The described procedures like those indicated in FIGS. 4 and 5A-C can be implemented as program code means of a computer program and/or as dedicated hardware of the receiver devices or transceiver devices, respectively. The computer program may be stored and/or distributed on a suitable medium, such as an optical storage medium or a solid-state medium, supplied together with or as part of other hardware, but may also be distributed in other forms, such as via the Internet or other wired or wireless telecommunication systems.

The invention claimed is:

1. An apparatus for supporting alignment of a first optical wireless communication, OWC, device to a second OWC device to provide an optical communication link between the first and second OWC devices, the apparatus comprising:
   a distance determination means configured to determine a distance between the first and second OWC devices;
   an alignment controller; and
   a user interface for providing an indication of an information related to signal quality;
   the alignment controller configured to determine based on the determined distance a maximum signal quality receivable from the second OWC device and to determine a relative signal quality based on the receivable maximum signal quality and a signal quality received from the second OWC device and measured at the first OWC device; and
   the visual indicator is an alignment indicator for providing the indication of an information related to the determined relative signal quality on the user interface, being one of a visual indicator or a graphical user interface, the indication relating the received signal quality relative to the receivable maximum signal quality at the determined distance.

2. The apparatus of claim 1, wherein the distance determination means is configured to determine the distance by using a pulse signal transmitted to the second OWC device and a return pulse signal received from the second OWC device.

3. The apparatus of claim 1, wherein the alignment controller is configured to derive the receivable maximum signal quality from a stored predetermined performance characteristic that associates the receivable maximum signal quality to the measured distance.

4. The apparatus of claim 1, wherein the alignment controller is configured to control an orientation of the first OWC device in space by applying a control signal derived from user input to a controllable mounting arrangement of the first OWC device or to control a direction of a light output of the OWC device by applying a control signal derived from user input to a controllable beam steering arrangement of the first OWC device.

5. The apparatus of claim 1, further comprising an attitude determination system for determining an attitude of the first OWC device.

6. The apparatus of claim 5, wherein the alignment controller is configured to calculate a value of the alignment indicator by using the following equation:

$$((RX1+RX2)/(2*ORX)*(1-TAE))*100\%,$$

wherein RX1 designates the measured signal quality at the first LiFi device, RX2 designates the measured signal quality received from the second OWC device, ORX designates the determined maximum signal quality receivable from the second OWC device at the measured distance, and TAE designates a total attitude error between attitude angles of the first OWC device and respective attitude angles received from the second OWC device.

7. The apparatus of claim 1, wherein the alignment controller is configured to switch the alignment indicator from the indication of the information related to the relative signal quality to an indication of an information related to an absolute value of the measured received signal quality at the first OWC device.

8. A remote control device for providing remote control of an alignment of a first optical wireless communication (OWC) device to a second OWC device to provide an optical communication link between the first and second OWC devices, the remote control device comprising the apparatus as claimed in claim 1, wherein the alignment controller is configured to control an orientation of the first OWC device in space by wirelessly transmitting a control signal to a controllable mounting arrangement provided at the first OWC device in response to a user input operation at the remote control device.

9. An add-on module mountable to an optical wireless communication device, the add-on module comprising the apparatus as claimed in claim 1.

10. An optical wireless communication (OWC) device comprising the apparatus as claimed in claim 1.

11. The OWC device of claim 10, further comprising an out-of-band transceiver used for at least one of an alignment communication and a distance measurement.

12. The OWC device of claim 10, further comprising a controllable mounting arrangement configured to change an orientation of the OWC device while mounted.

13. The OWC device of claim 10, further comprising a mechanic or electronic control element configured to control the alignment controller to provide a higher or lower resolution of the alignment indicator.

14. A method of supporting alignment of a first optical wireless communication, OWC, device to a second OWC device to provide an optical communication link between the first and second OWC devices, the method comprising:

determining a distance between the first and second OWC devices;

providing an indication of an information on a user interface related to signal quality;

determining based on the determined distance a maximum signal quality receivable from the second OWC device;

determining a relative signal quality based on the determined receivable maximum signal quality and a signal quality received from the second OWC device and measured at the first OWC device; and providing the indication of an information related to the determined relative signal quality on the user interface, wherein the user interface is one of a visual indicator or a graphical user interface, the indication relating the received signal quality relative to the receivable maximum signal quality at the determined distance.

* * * * *